United States Patent Office 3,792,150
Patented Feb. 12, 1974

3,792,150
METHOD OF ROASTING VANADIUM BEARING MATERIALS
John Augustus Maxwell and Michael Wallace Merrill, Soda Springs, Idaho, assignors to Kerr-McGee Chemical Corp., Oklahoma City, Okla.
No Drawing. Filed Mar. 10, 1972, Ser. No. 233,757
Int. Cl. C01g 31/00
U.S. Cl. 423—68                                                 9 Claims

ABSTRACT OF THE DISCLOSURE

This invention broadly relates to the roasting of vanadium bearing materials and to the recovery of vanadium values from the roasted product. More particularly, the invention relates to an improved process for roasting ferrophosphorus and recovering a high purity vanadium product therefrom.

BACKGROUND OF THE INVENTION

Ferrophosphorus is obtained as a byproduct in the extraction of phosphorus by smelting in an electric furnace under reducing conditions. The ferrophosphorus of commerce usually contains about 23–30% phosphorus, 52–62% iron, 3–9% vanadium, 2–7% chromium, and less than 2% of other extraneous metals such as titanium, nickel, manganese and silicon. An average analysis for one ferrophosphorus of commerce is 27.5% phosphorus, 7.07% vanadium, 4.67% chromium, 1.23% titanium, 1.36% nickel, 0.2% manganese, 0.4% silicon and the remainder iron. Ferrophosphorus has utility as a source of high phosphorus iron, but the vanadium and chromium values which are usually present are wasted when it is used in this manner. It has long been desired to provide an economical and efficient process for recovering vanadium values from ferrophosphorus, as this material is available in large quantities and would be a rich source of vanadium.

Ferrophosphorus is a reduced product and it is necessary to subject it to an oxidizing roast in order to oxidize the vanadium values to a water soluble state. As is well known, large quantities of contaminating substances are also rendered soluble by conventional roasting procedures in instances where the roast is sufficiently vigorous to result in the oxidation and solubilization of vanadium values. The contaminates appear in the resulting leach solution and in turn in the vanadium product precipitated therefrom. Phosphorus is an extremely deleterious contaminate and a vanadium oxide concentrate is rendered useless as a commercial product in instances where the phosphorus content exceeds more than very small amounts, such as 0.115% $P_2O_5$ (0.05% P). It is therefore obvious that the control of phosphorus solubilization during the roast is extremely important.

In accordance with one prior art process, ferrophosphorus was roasted under oxidizing conditions with an alkali metal salt which is alkaline such as sodium carbonate or sodium hydroxide. However, under these conditions, the solubilization of the vanadium values also resulted in the solubilization of prohibitive amounts of phosphorus. In instances where a alkali metal salt which is neutral such as sodium chloride was substituted for the more alkaline alkali metal salt in an effort to control the solubilization of phosphorus, the vanadium was not sufficiently solubilized to enable the vanadium values to be recovered in an economic and efficient manner.

Ferrophosphorus previously has been roasted in the presence of neutral alkali metal salts such as sodium chloride in a multiple hearth furnace of prior art design which includes a gas burner or burners to heat the charge to reaction temperature on the first hearth. Once the oxidation reaction has been initiated, there is no need to add additional heat as it is highly exothermic. The oxidation reaction may take place on the second, third and fourth hearths, for example, and the oxidation should be substantially complete by the time the roaster charge passes from the oxidizing zone of the roaster. For the final reaction between the oxidized vanadium and sodium chloride, additional heat is added by means of gas burners. Thus, when the oxidation reaction is completed on the fourth hearth, gas burners may be used on the fifth and sixth hearths to provide the necessary heat.

While the roaster operation described above sometimes results in satisfactory solubilization of the vanadium, operating problems are encountered when attempts are made to roast a mixture of ferrophosphorus and sodium chloride. Perhaps the most serious problem is fusing of the roaster feed, which results in slag formation and forces a shutdown of the roaster. Additionally, there is a problem in controlling the temperature within the roaster on the hearths where the exothermic oxidation reaction is taking place. The temperature control is usually attempted by admitting air through openings in the roaster and the excess air also provides the oxidizing atmospheres which is necessary for oxidizing the vanadium values. This type of temperature control has not been entirely saisfactory and there has been a long and great need for an efficient method of controlling the temperature within the oxidation section of the roaster and at the same time elevating the fusion temperature of the charge material, thereby preventing fusion.

In a more recent process, (U.S. Pat. 3,332,736) a diluent is added to a finely divided ferrophosphorus and sodium chloride roaster charge mixture which raises the fusion temperature markedly and also results in the insolubilization of the phosphorus and other impurities, thus, substantially overcoming the disadvantages of the prior art roasting processes.

However, there is still a need for an improved roasting process. Moreover, the use of substantial quantities of alkali metal salts such as, for example, sodium chloride and potassium chloride in such roasting processes necessarily result in an effluent gas containing Cl, NaCl and HCl. Obviously, of course, such a gas is an undesirable, environmental pollutant. Therefore, a process that would substantially reduce the amount of NaCl required is desirable.

SUMMARY OF THE INVENTION

The present invention relates to the roasting of ferrophosphorus materials containing vanadium and recovering a vanadium product therefrom. More particularly, the present invention relates to an improvement in a process, such as that disclosed in U.S. Pat. 3,332,376, wherein a vanadium bearing material is roasted in admixture with certain compounds. Specifically it now has been discovered that when a finely divided vanadium bearing material is roasted under oxidizing conditions in intimate admixture with a finely divided alkali metal salt, a finely divided sodium carbonate and a finely divide alkaline earth metal carbonate in an amount sufficient to act as a diluent, then the problems of the prior art discussed hereinbefore are overcome. For instance, the fusion temperature of the roaster feed is elevated sufficiently so that fusion of the finely divided charge within the roaster is no longer a problem, and the alkaline earth metal and sodium carbonate, under the conditions of the roast, act as heat sinks and aid greatly in controlling the temperature within the furnace during the oxidation stage.

The addition to the roaster feed of the alkaline earth metal carbonate in the amount defined herein does not interfere with the solublization of the vanadium values, and it also has the further benefit of controlling the solubilization of phosphorus values. Further, it has been discovered that the addition of sodium carbonate permits a 25 to 30% reduction in the amount of alkali earth and alkaline earth metal carbonate required. Further, the addition of sodium carbonate to the roaster feed results in a 150° to 200° F. reduction in the sensible heat of exothermic reaction since sodium carbonate has a higher endothermic reaction phase per unit than the alkaline earth metal carbonate. Still further, the addition of sodium carbonate results in an increase in the formation of water soluble sodium vanadates in the roasting process.

DESCRIPTION OF A PREFERRED EMBODIMENT

The presently preferred vanadium bearing material is ferrophosphorus, which will be specifically referred to in illustrating the invention. Ferrophosphorus as received is in the form of lumps of substantial size and it should be ground to a fine particle size prior to roasting. Usually, it is preferred that the ferrophosphorus be reduced to a particle size of about minus 20 to about minus 200 mesh, and for best results to about minus 100 or minus 120 mesh. However, larger or smaller particle size material may be used in instances where this is desired. There are advantages to grinding the ferrophosphorus to a larger particle size than minus 120 mesh, such as to about minus 80 mesh, to reduce the grinding cost and the problems of handing a finely divided material. Prior art apparatus and processes may be used for reducing the ferrophosphorus to the desired particle size, such as a hammer mill and/or ball mill.

The alkali metal salt to be mixed with the ground ferrophosphorus may be a sodium or potassium salt and preferably is a sodium chloride or potassium chloride. In most instances, it is preferred that a substantially neutral sodium or potassium salt of a strong mineral acid be used, such as the sulfates, nitrates, or chlorides. Sodium or potassium chloride should form at least a portion of the alkali metal salt for better results. Sodium chloride is much preferred over other alkali metal salts and, for best results, usually it is used as the sole alkali metal salt.

The preferred amount of alkali metal salt to be added is about 5 to 20 parts by weight, and for best results about 10-15 parts by weight, for each 100 parts by weight of the ferrophosphorus. The use of larger amounts usually is not harmful from the standpoint of the solubilization of the vanadium values, but has no advantage and may result in unnecessary pollution. In addition, the alkali metal salt is often the lowest melting component in the roaster and an excess tends to lower the fusion point of the roaster feed. The alkali metal salt may be added to the ferrophosphorus at any desired stage prior to the roasting.

The alkali metal salt is preferably added as a slightly coarser material than the ferrophosphorus, and may have a particle size, for example, of about minus 10-100 mesh. However, larger or smaller particle size material may be used. For economic reasons, a minus 10 mesh alkali metal salt is preferred in most instances.

The diluent to be added to the above mentioned components of the roaster feed may be calcium carbonate, magnesium carbonate, or mixtures thereof including dolomite. Specific examples include calcite or limestone, magnesite, dolomite, etc. Limestone is usually the least expensive and most readily available and is preferred for economic reasons. The alkaline earth metal carbonate may be reduced to any suitable particle size such as minus 10 to minus 100 mesh, although larger or smaller particle size material may give satisfactory results. It is important that the alkaline earth metal carbonate be added in an amount sufficient to act as a diluent and to aid in controlling the roasting temperature, such as at least 60 parts by weight for each 100 parts by weight of ferrophosphorus. Good results are obtained when about 80 to about 130 parts by weight of the alkaline earth carbonate are present, and usually best results with about 90–110 parts by weight, for each 100 parts by weight of the ferrophosphorus.

The term "sodium carbonate" as used herein includes light or dense soda ash, a commercially available form of sodium carbonate containing about 99% by weight $Na_2CO_3$. The sodium carbonate preferably is added in granular form having a screen size of about 100 mesh U.S.

The amount of sodium carbonate required is both a function of its heat sink effect and the quantity of vanadium present for reaction to the formation of sodium vanadates. This is not a stoichiometric amount to satisfy the chemical reaction as some sodium is available from the sodium chloride after the chloride reaction with phosphorus in the formation of the calcium phosphorus chloride.

The preferred amount of sodium carbonate is about 10 to 25 parts by weight, and for best results about 15 to 20 parts by weight, for each 100 parts by weight of the ferrophosphorus. It is essential that the sodium carbonate be present in an amount of at least 10 parts by weight for each 100 parts by weight of the ferrophosphorus.

As will be appreciated by those versed in the art, greater quantities of sodium carbonate may be used. However, use of such greater quantities will result in the formation of an increased amount of undesirable water soluble sodium phosphates.

Sodium carbonate is a more effective heat sink, on a weight basis, than calcium carbonate. Thus, the addition of sodium carbonate to a roaster feed in accordance with the instant invention effects a 100° F. to 200° F. reduction in the exothermic reaction temperature (roasting temperature). Further, it has been discovered that when practicing the process of the instant invention a greater percentage of water soluble vanadium values are produced than otherwise would be possible. Still further, the addition of sodium carbonate permits a reduction in the quantity of diluent (alkaline earth metal carbonate) required. Thus, since the roaster feed contains less diluent it necessarily follows that the capacity of the roaster unit is increased. Indeed, it has been found that a roaster unit capacity may be increased from 10 to 25 percent when operated in accordance with the improved process of the instant invention.

The four essential components of the roaster feed may be blended together in finely divided form and the blend fed to a roaster. The roaster may be of a prior art construction and a specific type is not necessary for practicing the invention. The preferred roaster is a multiple hearth, gas fired roaster with means for rabbling the above mentioned feed mixture and causing it to pass through a series of hearths and then finally from the furnace as a roasted product containing oxidized and solubilized vanadium values.

In a preferred embodiment, the first zone of the roaster is provided with heating means such as gas burners for bringing the feed mixture up to the temperature at which oxidation of the vanadium values takes place. A satisfactory temperathre is about 1300–1650° F., when measured in the gaseous phase approximately 2" above the roasting beds of the feed mixture. The feed mixture is usually heated up to reaction temperature when on the first hearth, and then passed to the second hearth where the oxidation reaction begins to take place. Once oxidation has commenced, there is no need for adding additional heat as the oxidation reaction is highly exothermic. In fact, it is during the oxidation phase of the roast that care must be taken to prevent the temperature from rising to a level at which the feed mixture will fuse. Fusion of the feed mixture inside the roaster results in serious operation difficulties, and usually requires that the roaster be shut down for cleaning purposes.

The presence of the alkaline earth metal carbonate and sodium carbonate have a two-fold beneficial effect during the oxidation stage of the roasting process, viz, less material for oxidation is present per unit volume and therefore less heat of oxidation is released per unit volume, and the alkaline earth metal carbonate and particularly the sodium carbonate act as heat sinks due both to their heat capacity and the highly endothermic decomposition thereof. Additionally, the alkaline earth metal carbonate has the beneficial effect of raising the fusion temperature of the feed mixture to a level such that fusion does not occur. The alkaline earth metal carbonate and sodium carbonate greatly simplify the operation of the roaster and it is possible to maintain the roasting temperature at 1300–1650° F., and preferably between 1400 and 1500° F., without any difficulty.

The oxidized vanadium values react with the sodium carbonate in the final stages of the roast to form sodium vanadate salt. Additional heat is provided in the final hearth of the roaster, or once the oxidation is no longer sufficiently vigorous to maintain the desired roasting temperature, to aid in the final reaction and conversion of the oxidized vanadium to the sodium vanadate salt. Once the reaction forming sodium vanadate is complete, the resulting roasted ferrophosphorus may be cooled following a desired prior art quenching procedure. The quenching step may be accomplished by allowing the hot roast to cool in air at ambient temperature, air or steam may be passed over the hot roast, or it may be sprayed with water or actually immersed in water.

The quenched roasted product may be processed to recover the solubilized vanadium by prior art processes. For instance, the roast may be percolation or agitation leached with water or water containing a desired solubilizing constituent or aid. The resulting leach liquor contains the solubilized vanadium values and greatly reduced amounts of phosphorus and other undesirable impurities than would otherwise be present in the absence in the roast of the alkaline earth metal carbonate.

If desired the phosphorus content of the leach liquor may be reduced by the addition thereto of a magnesium salt and sufficient ammonia to provide a pH of from about 7.0 to about 8 whereby the phosphate is precipitated as a crystalline magnesium phosphate compound. The magnesium phosphate compound is readily removable by filtration. The phosphate content of the leach liquor is reduced to about 0.05 gram per liter.

Applicable magnesium salts include, for example, magnesium chloride, magnesium sulfate and the like. The amount of magnesium salt required to remove the phosphorus is, of course, dependent upon the quantity of phosphorus in the leach liquor. Generally an excess of the stoichiometric requirements of magnesium salt are required. Specifically, it has been found that a leach liquor containing 3–4 grams per liter phosphorus requires about eight grams of magnesium sulfate to precipitate one gram of phosphorus. A preferred magnesium salt is magnesium chloride since lesser amounts are required, viz, about 3 grams to precipitate one gram of phosphorus. A leach liquor having a lower concentration of phosphorus may require about twelve grams of magnesium salt to precipitate one gram of phosphate.

The vanadium values may be recovered from the leach liquor by any suitable prior art procedure. While not limited thereto, one method involves precipitating the vanadium values as ammonium metavanadate by addition of an ammonium compound such as, for example, ammonium chloride, ammonium sulfate or ammonium nitrate. The resulting ammonium metavanadate may be purified by digestion in the presence of a small amount of base such as sodium hydroxide or sodium carbonate, and then reprecipitated as ammonium metavanadate by the addition of a further quantity of the ammonium compound. The purified ammonium metavanadate may be dried, decomposed by heating to form vanadium pentoxide, and fused to produce black cake.

A vanadium product also may be recovered from the leach liquor by acidification with sulfuric acid to a pH range at which the vanadium values are precipitated as red cake, and then heating the liquor between about 60° C. and the boiling point. Also, the vanadium values may be recovered by acidifying the liquor to a pH value of about 0.5–1.7, followed by heating as above to precipitate the vanadium values as a hydrous vanadium oxide product. In either instance, the red cake or vanadium oxide product may be fused to produce black cake.

An excessive amount of the alkaline earth metal carbonate should not be added to the roaster feed as insoluble calcium vanadates may be formed and the vanadium values will not be leached out in the subsequent leaching step. Usually, the maximum amount which should be added is about 5 moles of the alkaline earth metal carbonate for each 3 moles of phosphorus present in the ferrophosphorus.

The foregoing detailed description and the following specific examples are for purposes of illustration only and are not intended as being limiting to the spirit or scope of the appended claims.

EXAMPLE I

A commercial ferrophosphorus containing 8.8% vanadium and 24–26% phosphorus is used in preparing the roaster feed for this example. The ferrophosphorus is ground to 98% minus 150 mesh (Tyler). The ground ferrophosphorus is mixed with sodium chloride and soda ash ground to minus 35 mesh, and limestone ground to minus 16 mesh (93% $CaCO_3$, and the remainder largely inert materials), and the mixture is blended.

The roaster used is a prior art 18" I.D. gas-fired, natural draft, 4-hearth laboratory scale roaster having two rabble arms per hearth. A blend of the feed composition containing 100 parts by weight of the ferrophosphorus, 20 parts by weight of the sodium chloride, 15 parts by weight of the soda ash and 100 parts by weight of the limestone is fed to the roaster at the rate of 19.1 grams per minute, and is roasted therein for about 60 minutes at an average roasting temperature of 1475° F. The roasting temperature is measured in the gases above the beds of the roasting ferrophosphorus at a distance of about 2" above the hearths. An oxidizing atmosphere is maintained in the roaster by supplying air thereto in an amount in excess of the quantity required to combust the gas, thereby oxidizing the vanadium values.

Rabbling is excellent throughout the run, and no stickiness or slagging is observed in the roaster.

The roasted ferrophosphorus is leached with water to produce a vanadium-bearing leach liquor containing 88.2% by weight of the vanadium content of the roasted product. Thus, there is excellent solubilization of the vanadium. The leach liquor is analyzed and the phosphorus content found to be about 5 to 7 grams per liter. It is possible to precipitate the vanadium values from the leach liquor by adjusting the pH to 2.0–2.5, and heating to approximately 80–100° C. The precipitated vanadium oxide product is filtered, dried and fused to obtain a black cake meeting commercial specifications as to phosphorus and other contaminants.

EXAMPLE II

The general procedure of Example I is repeated with the exception that feed comprises a prior art composition containing 100 parts by weight of ferrophosphorus, 120 parts by weight of limestone and 30 parts by weight of sodium chloride. Upon leaching the roasted product with water, 82.7% of the vanadium content is water soluble. The leach liquor is analyzed and found to contain about 3 to 4 grams per liter phosphorus.

EXAMPLE III

The general procedure of Example I is repeated except the feed composition contains 100 parts by weight of ferrophosphorus, 98.6 parts by weight of limestone, 19.6 parts sodium chloride and 19.9 parts by weight of soda ash. Upon leaching the roasted product with water, 88.3% of the vanadium content is water soluble. The leach liquor is analyzed and found to contain about 5.0 to 7.0 grams phosphorus per liter.

EXAMPLE IV

Example I is repeated except the feed composition contains 100 parts by weight of ferrophosphorus, 103 parts by weight limestone, 14.9 parts by weight sodium chloride and 18.5 parts by weight soda ash. The vanadium of the roasted product is 89.4 percent water soluble upon leaching with water.

What is claimed is:

1. A process for recovering vanadium values from vanadium bearing material comprising roasting under oxidizing conditions at a temperature of about 1300–1650° F., a finely divided mixture including ferrophosphorus, at least one alkali metal salt selected from the group consisting of substantially neutral sodium and potassium sulfates, nitrates and chlorides; an alkaline earth metal carbonate selected from the group consisting of calcium carbonate, magnesium carbonate and mixtures thereof; and at least 10 parts by weight sodium carbonate for each 100 parts by weight of the ferrophosphorus, leaching the roasted product with an aqueous leaching medium to produce an aqueous solution containing vanadium values and phosphorus, and recovering the vanadium containing aqueous solution, said alkaline earth metal carbonate being present in an amount of at least 60 parts by weight for each 100 parts by weight of the ferrophosphorus.

2. The process of claim 1 wherein the alkaline earth metal carbonate is present in an amount of about 60–150 parts by weight for each 100 parts by weight of the ferrophosphorus.

3. The process of claim 2 wherein the alkali metal salt is sodium chloride present in an amount of from 10 to 15 parts by weight for each 100 parts of the ferrophosphorus.

4. The process of claim 1 wherein the sodium carbonate is present in an amount of from about 10 to 25 parts by weight for each 100 parts by weight of ferrophosphorus.

5. The process of claim 1 wherein the alkaline earth metal carbonate is present in an amount not exceeding 5 moles of alkaline earth metal for each 3 moles of phosphorus contained in the ferrophosphorus.

6. The process of claim 5 wherein the alkaline earth metal carbonate is limestone.

7. The process of claim 5 wherein the alkaline earth metal carbonate is dolomite.

8. The process of claim 1 wherein the vanadium containing aqueous solution is maintained at a pH of from about 7.0 to 8.0, a magnesium salt is added in an amount sufficient to precipitate a magnesium phosphate compound and the magnesium phosphate compound is separated from the aqueous solution.

9. The process of claim 8 wherein the magnesium salt is added in an amount sufficient to provide about 3 grams of salt per gram of phosphorus in the aqueous solution and said salt is magnesium chloride.

References Cited
UNITED STATES PATENTS

| | | | |
|---|---|---|---|
| 2,654,655 | 10/1953 | Banning et al. | 423—62 |
| 3,346,329 | 10/1967 | Hermann | 423—68 X |
| 3,332,736 | 7/1967 | Shaw et al. | 423—68 |
| 2,501,952 | 3/1960 | Maier | 423—62 X |
| 3,597,153 | 8/1971 | Atmore et al. | 423—62 |
| 3,376,103 | 4/1968 | Henrickson et al. | 423—68 X |

HERBERT T. CARTER, Primary Examiner

U.S. Cl. X.R.

423—62, 305